United States Patent [19]

Taketomi et al.

[11] 4,357,636

[45] Nov. 2, 1982

[54] MAGNETIC TAPE DEVICE

[75] Inventors: Chiaki Taketomi; Tadao Miura; Keiji Akiba; Koji Hirose, all of Toda, Japan

[73] Assignee: Clarion Co., Ltd., Tokyo, Japan

[21] Appl. No.: 115,199

[22] Filed: Jan. 25, 1980

Related U.S. Application Data

[63] Continuation of Ser. No. 927,637, Jul. 24, 1978, abandoned.

[51] Int. Cl.³ .................. G11B 15/12; G11B 27/02
[52] U.S. Cl. ................................. 360/62; 360/13; 360/61
[58] Field of Search .................. 360/61, 62, 63, 13, 360/92

[56] References Cited

U.S. PATENT DOCUMENTS

| | | |
|---|---|---|
| 2,481,904 | 9/1949 | Camras ............................. 360/62 |
| 3,703,041 | 11/1972 | Kohtani . | 
| 3,964,097 | 6/1976 | Kobayashi et al. ................... 360/92 |
| 4,095,261 | 6/1978 | Rodriquez ........................... 360/13 |
| 4,121,262 | 10/1978 | Ushio et al. ........................ 360/13 |
| 4,122,500 | 10/1978 | Bradford et al. ................... 360/13 |

*Primary Examiner*—Vincent P. Canney
*Attorney, Agent, or Firm*—Wallenstein, Wagner, Hattis, Strampel and Aubel

[57] ABSTRACT

A magnetic tape device having two independently operative tape transports incorporated in one common deck which comprises means for selectively performing recording by a first transport in combination with reproducing by a second transport and reproducing by the first transport in combination with recording by the second transport, and means for recording a reproduced signal from either one of the transports on the other transport through a common reproducing and recording process circuit, thereby to effect dubbing in either direction.

7 Claims, 6 Drawing Figures

4,357,636

MAGNETIC TAPE DEVICE

This is a continuation of application Ser. No. 927,637, filed July 24, 1978.

BACKGROUND AND SUMMARY OF THE INVENTION

This invention relates to a magnetic tape device for audio use, and more particularly to a magnetic tape device having two-tape transports operatively associated with each other and housed in a single deck.

An audio-use magnetic tape of this type is now manufactured and sold by the assignee of this application under a trademark, DUBBING "X". This DUBBING "X" has a master and a slave tape-transport. Among various modes of operation it has, the most characteristic is that it enables a selected portion of a program reproduced by the master transport to be recorded through a simple operation on a tape of the slave transport. In this connection, it is to be noted that if the recorded contents of the slave transports can be dubbed on a tape of the master transport, it will increase the modes of operation and enlarge the applicability of the device.

It is therefore an object of the present invention to provide a magnetic tape device which is capable of effecting dubbing in either direction.

It is another object of the present invention to provide a magnetic tape device which is capable of continuously and automatically implementing a same mode of operation from one transport to another transport without interruption.

It is a further object of the present invention to provide a magnetic tape device which is capable of preferentially implementing the mode of operation for predetermined one of the transports when both the transports are preset in the same mode of operation (recording or reproducing).

It is a still further object of the present invention to provide a magnetic tape device which is capable of electrically performing head selection with ease and high reliability so as to alternatingly bring a first transport and a second transport into a recording and a reproducing mode.

The invention will be better understood from the following description taken in connection with the accompanying drawings.

DETAILED DESCRIPTION OF THE INVENTION

Figure 1A:
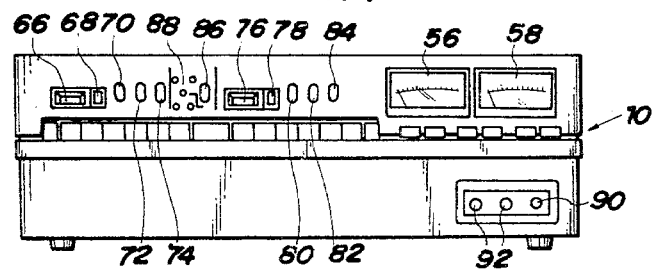
FIG. 1A is a front view of a dual cassette stereo deck with a magnetic tape device of the present invention incorporated therein.
Figure 1B:
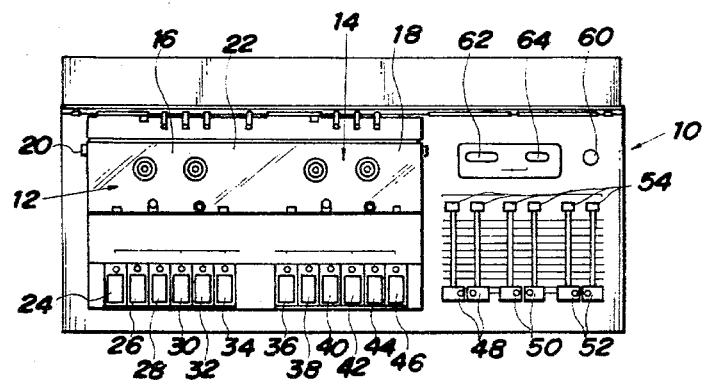
FIG. 1B is a top view of the dual cassette stereo deck of FIG. 1A.

Referring now to FIGS. 1A and 1B, there is illustrated a dual cassette stereo deck. The deck 10 has two tape transports, namely, a tape transport 12 and a tape transport 14. The transports 12 and 14 have magnetic tape cassette housing portions 16 and 18, respectively. A transparent cassette cover 22 is removably hinged by setscrews. Each of the transports has various operation buttons. The first transport 12 has a recording (REC) button 24, a rewinding (RWD) button 26, a fast forwarding (FF) button 28, a playing (PLAY) button 30, a stopping (STOP) button 32 and a pausing (PAUSE) button 34. The second transport 14 also has a REC button 36, a RWD button 38, a FF button 40, a PLAY button 42, a STOP button 44 and a PAUSE button 46.

The deck 10 has various operation means and operation monitor means. Numerals 48, 50 and 52 designate a tape level control knob, line input level control knob and a microphone level control knob of slide positioning type, respectively. A level marker 54 is provided for indication of preset position of each knob. Numeral 56 designates a level meter for a left channel and numeral 58 designates a level meter for a right channel. A power switch 60 of push button type is provided on a top panel. On the top panel, there are further provided a monitor input change-over switch 62 of three-position type and a monitor switch 64 of two-position type. On a front panel of the deck 10 are provided not only the two level meters 56 and 58 as mentioned above but also a tape counter 66, counter resetting button 68, memory switch 70, bias change-over switch 72 and equalizer change-over switch 74 each associated with the first transport 12 and a tape counter 76, counter resetting button 78, memory switch 80, bias change-over switch 82 and equalizer change-over switch 84 each associated with the second transport. A relay switch 86 and function indicator means 88 comprised of five light emitting diodes are also provided on the front panel.

As mentioned above, the deck 10 has two tape transports 12 and 14 operatively associated with each other and has variable functions. Each of the tape transports 12 and 14 can independently implement the respective recording and reproducing modes. The deck 10 further enables recording or reproducing from one transport to another transport. Dubbing associated with the respective transports can be performed in a simplified mode of operation.

Figure 2:
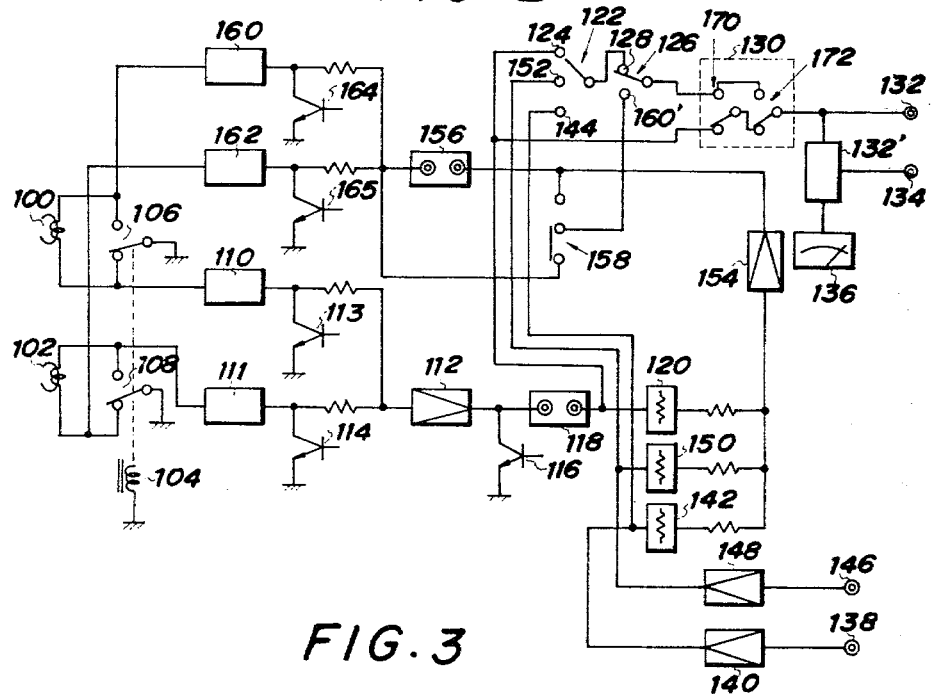
FIG. 2 is a block diagram of the inner structure and wiring of FIG. 1.

FIG. 2 is a schematic diagram of the operational circuit of the deck 10 as shown in FIG. 1. It is to be noted that the deck 10 actually has a stereo structure. Numeral 100 is a record/playback head associated to the first tape transport 12 and numeral 102 a record/playback head associated with the second tape transport 14. A relay 104 has two switch circuits 106 and 108. In the switch position as shown in FIG. 2, the relay 104 is de-energized and is so connected as to put the first tape transport 12 in the recording mode and the second tape transport 14 in the reproducing mode. When the relay 104 is energized, the operative relation is reversed. Stated illustratively, the electrical circuit is so designed that when one of the transports is in the recording mode, the other is in the reproducing mode. The energized contact of the switch circuit 106 and the unenergized contact of the switch circuit 108 is connected to a mixing amplifier 112 through reproducing amplifiers 110 and 111, respectively. The reproducing amplifiers each has means for equalization of the reproduced signals. Transistors 113 and 114, when turned on, will effectively ground the respective signal lines. A transistor 116 acts mainly for muting. The reproduced signal passed through a removable jumper wiring 118 is supplied to a slide volume means 120 associated with the tape level control knob 48 as shown in FIG. 1 as well as to a tape contact 124 of a switch 122 associated with the monitor input change-over switch 62. The reproduced signal passed through the switch 122 is fed to a source contact 128 of a switch 126 corresponding to the monitor switch 64 of FIG. 1 and further fed to a line output terminal 132 through a monitor selector switch 130 as well as to a headphone terminal 134 and a meter 136 through a meter and headphone amplifier 132'. The meter 136 corresponds to the level meters 56 and 58 in FIG. 1. The headphone terminal 134 corresponds to a headphone jack 90 as shown in FIG. 1.

A microphone input from a microphone input terminal 138 corresponding to a microphone jack 92 as shown in FIG. 1 is applied through a microphone amplifier 140 to a slide volume means 142 corresponding to the microphone level control knob 52 as shown in FIG. 1 and further applied to a microphone contact 144 of the monitor input change-over switch 122. A signal from a line input terminal 146 is supplied through a line amplifier 148 to a slide volume means 150 corresponding to the line input level control knob 50 of FIG. 1 and further applied to a line contact 152 of the switch 122.

The signals from the respective slide volume means 120, 142 and 150 are applied to one terminal of a jumper wiring 156 similar to the above-mentioned jumper wiring 118 through a mixing amplifier 154. An accessory selector 158 has a common contact connected to a disc record terminal 160' of the monitor switch 126 and another terminal respectively connected to the terminal of the jumper wiring 156.

The other terminal of the jumper wiring 156 is connected to a recording amplifier 160 associated with the first transport 12 and to a recording amplifier 162 associated with the second transport 14. At the inputs of the respective recording amplifiers 160 and 162 are connected transistor switches 164 and 165. When these transistors 164 and 165 are turned on, the inputs to the respective amplifiers are effectively grounded.

The jumper wiring 118 and 156 may be connected to "Dolby" noise reduction systems, respectively. In this case, the accessory selector 158 is shifted into such a position that its common contact is connected to the output of the mixing amplifier 154 from the position as shown in FIG. 2. Therefore, the output of the mixing amplifier 154 is supplied for monitor indication and coupled to the recording amplifiers through the noise reduction system connected to the jumper wiring 156. When the accessory switch 158 is in such a position as shown in FIG. 2, the signal at the output of the jumper wiring 156 and accordingly at the output of the noise reduction system is indicated for monitor through the common contact of the selector 158. In case the wiring 156 has such a structure as just connected with a jumper line, the switch 158 will provide the same signal to the monitor irrespectively of its position.

A switch structure similar to the accessory switch 158 may be provided to the jumper wiring 118. In this case, a common contact is connected to the tape contact 124 of the switch 122. Accordingly, with this structure, the monitor condition is changed simply by a switch operation.

The monitor selector switch 130 is an electronic switch and is comprised of a first switch 170 and a second switch 172. The first switch 170 is responsive to the REC button 24 of the first tape transport 12 and actuated from the position as shown in FIG. 2 to another position when the button 24 is depressed. The second switch 172 is responsive to the REC button 36 of the second tape transport 14 and shifted from the position as shown in FIG. 2 to another position when the button 26 is depressed. Stated illustratively, when either of the REC buttons are depressed, the switch 126 is connected to the line output terminal 132 and then a recording monitor or a monitor for a recording input (determined by the switch 122) is enabled. On the other hand, if neither of the REC buttons is pressed, the switches 170 and 172 remain in the respective positions as shown in FIG. 2. Then, the reproducing output of the jumper wiring 118 is monitored and produced at the reproducing output terminal 132.

Figure 3:
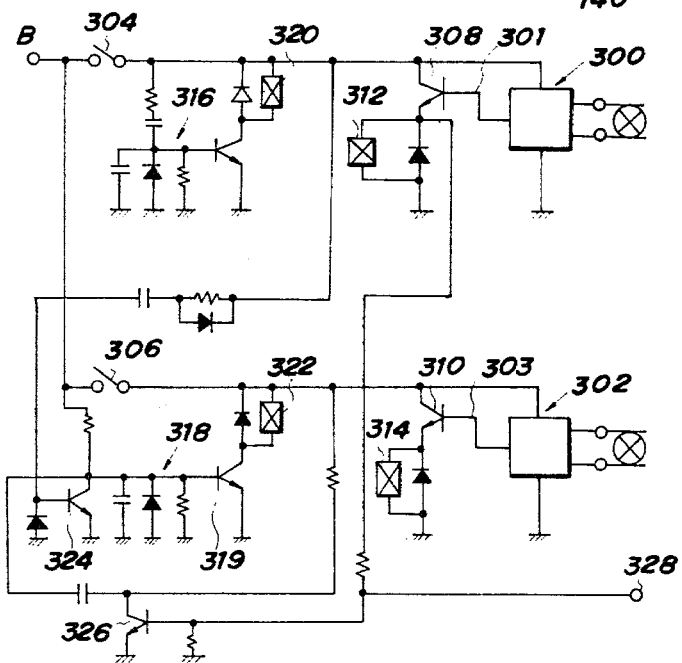
FIGS. 3 and 4 are block diagrams showing various control and monitor indication circuits.
Figure 4:
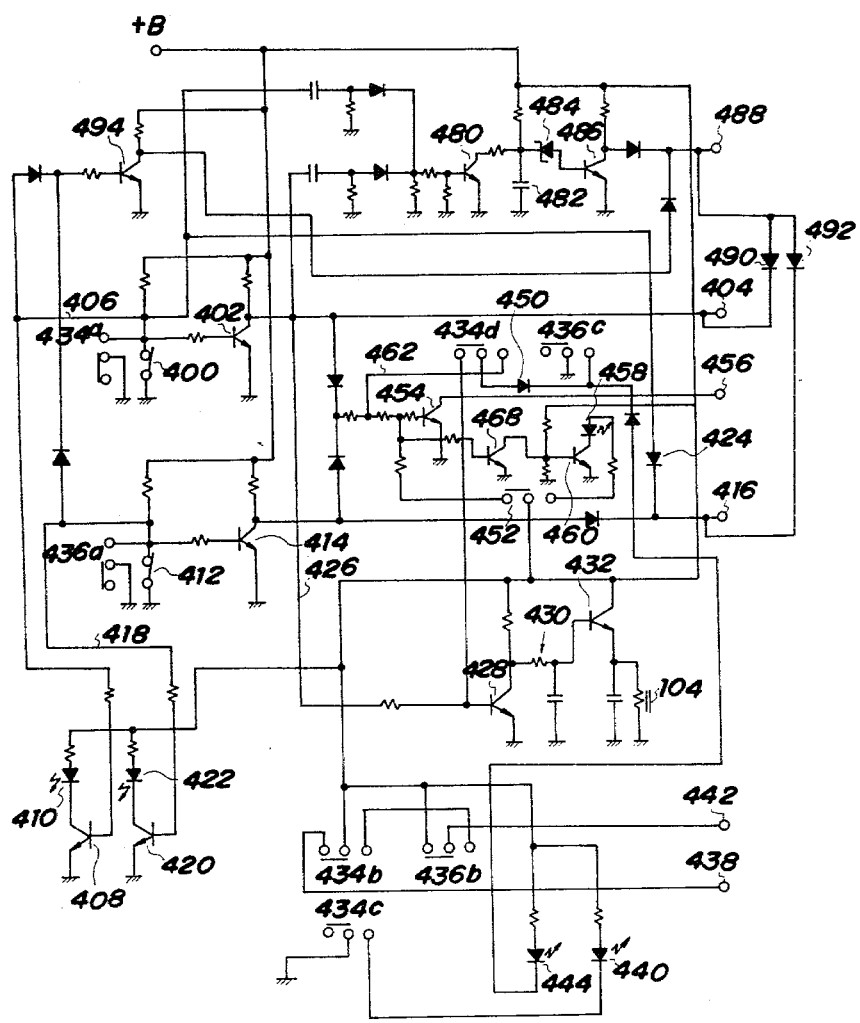

The deck 10 with the present invention incorporated therein can assume various modes of operation in combination of or association with the modes of operation of the first tape transport 12 and the second tape transport 14. FIGS. 3 and 4 show the control circuits for the modes of operation.

In FIG. 3, there are provided means 300 and 302 for sensing the tape drive conditions of the first and second transports. A switch 304 is turned on in response to the operations of the PLAY button, FF button and RWD button of the first transport 12. Likewise, a switch 306 is turned on in response to the operations of the PLAY button, FF button and RWD button of the second transport 14. In the transports, positive voltages are set up at the outputs 301 and 303 of the detecting means 300 and 302, respectively so long as the reel turntables are rotated to turn on the transistors 308 and 310. When the reel turntables are stopped, which results in no output, automatic stop solenoids 312 and 314 are deenergized and the modes of operation set in the respective transports by the locked buttons are released. Circuits 316 and 318 are timer starting circuits for the first and second transports, respectively. The circuits 316 and 318 have timer starting plungers 320 and 322, respectively. A transistor 324 constitutes part of a timer starting preferential circuit for the first tape transport. A transistor 326 constitutes part of a preferential circuit for preferentially effecting the operation associated with the first tape transport in continuous or uninterrupted recording or reproducing modes. To a terminal 328 is applied a relay (continuing) instruction signal as mentioned hereafter referring to FIG. 4.

FIG. 4 shows a circuit for controlling the relay 104 and transistors 113, 114 and transistors 164, 165 of FIG. 2. When the PLAY button associated with the first transport 12 is depressed, a normally closed (NC) switch 400 is opened. Then, a transistor 402 normally kept off is turned on. When the transistor 402 is thus turned on, the electrical potential of a terminal 404 is grounded. Since the terminal 404 is connected to the base of the transistor 113 (FIG. 2) on the output side of the reproducing amplifier 110 associated with the first transport, this change to the grounding level allows the transistor 113 normally kept on to be turned off. Further, the opening of the switch 400 raises the level of a line 406 from the grounding level to a certain positive level, so that a transistor 408 is turned on. Then, a light emitting diode (LED) 410 goes on. The lighting of the LED 410 indicates that the first transport 12 is in the reproducing mode. When the PLAY button of the second transport 14 is depressed, a normally closed switch 412 is opened. This turns on a transistor 414 which in turn causes the second transistor on the reproducing side of FIG. 2 to be off through a terminal 416. On the other hand, the opening of the switch 412 allows the level of a line 418 to be raised to a positive potential, so that a transistor 420 is turned on, which in turn causes a LED 422 to light. The lighting of the LED 422 indicates that the second transport is in the reproducing mode. Means is provided for preferentially effecting the reproducing of the first transport alone when both the PLAY buttons of the respective transports are depressed. This means comprises a diode 424. More particularly, the transistor 114 is turned on by applying a positive voltage to the terminal 416.

As mentioned above, when the transistor 402 is turned on for the reproducing mode of the first transport, a line 426 gets to the grounding level whereby a transistor 428 is turned off. This in turn causes a transistor to be on after a predetermined delay (0.5 second) determined by a time constant circuit 430 and then the relay 104 is energized. Stated illustratively, the relay switches 106 and 108 are deplaced from the positions as shown in FIG. 2 and the head 100 is connected to the reproducing amplifier 110 associated from the first transport through the switch circuit 106.

In FIG. 4 there are shown switches 434a, 434b, 434c and 434d responsive to the REC button of the first tape transport and switches 436a, 436b and 436c responsive to the REC button of the second tape transport. The figure shows these switches all in the off positions, i.e., in such states that the REC buttons are not depressed. Upon depression of the REC button of the first transport (the depression of the PLAY button conditions the setting of the recording mode) the transistor 402 is turned off by the switch 435a. This, in turn, turns on the muting transistor of FIG. 2 and deenergizes the relay 104. Further, it turns off the transistor 408 to stop the lighting of the LED 410. A switch 434b removes +B voltage out of a terminal 438 which turns off the muting transistor 164. Thus, the input of the record amplifier associated with the first transport is released from the grounding. The switch 434c turns on a LED 440. This indicates that the first transport is in the recording mode. On the other hand, when the REC button of the second transport is depressed, the switch 436a turns off the transistor 414. This applies a positive voltage to the terminal 416 and accordingly turns on the muting transistor 114. Further, the transistor 420 is turned off and as a result, the LED 422 ceases to conduct. The switch 436b removes +B voltage from a terminal 442 whereby the muting transistor 165 is turned off. The switch 436c turns on a light emitting diode 444, which indicates that the second transport is in the record mode.

Even if the REC buttons of the both transports are depressed concurrently, the deck 10 preferentially puts the first tape transport into the recording mode. Stated illustratively, the simultaneous actuation of the switches 434b and 436b applies +B voltage to the terminal 442 so that the transistor 165 is turned on.

The actuation of the switch 436c further makes the base bias voltage of the transistor 428 to bypass to the ground through a diode 450. This turns off the transistor 428 and then turns on a transistor 432 to energize the relay 104.

The deck 10 of the embodiment according to the present invention is capable of continuous recording and continuous reproducing without interruption. To this end, is provided a relay switch 452 corresponding to the relay 86 as shown in FIG. 1. The switch 452 is shown in its off position in FIG. 4. In such an off position, +B voltage is continually applied to the base of a transistor 454. Only when both the first and the second transports are instructed to record or playback, this continuous operation mode is set up.

When the transistor 454 is turned on the terminal 328 (FIG. 3) connected to a terminal 456 is brought into a grounded state. This means that the transistor 326 of FIG. 3 is not turned on. When the relay switch 452 conducts, +B voltage is applied to a transistor 460 through a LED 458. In this state the transistor 454 is turned off under the condition that both the transistors 402 and 414 are simultaneously conducting, i.e., when both the PLAY buttons of the first and the second transport are depressed to turn off the switches 400 and 412 or when both the REC buttons of the first and the second transport are depressed to actuate the switches 434d and 436c, causing the line 462 to be grounded through the diode 450. At this time, the terminals 456 and 328 are released from the grounded states so that when the first tape transport is caused to be automatically stopped, the resulting pulse signal causes the transistor 319 of the timer starting circuit as well as the transistor 326 to conduct. Then, the plunger 322 for releasing the PAUSE button of the second tape transport is energized.

The no-base bias condition of the transistor 454 (FIG. 4) causes a transistor 468 to be turned off. As a result, the transistor 460 is turned on, which in turn lights the LED 458. This indicates that the deck 10 is in the continuous record or continuous playback mode (relay mode).

Figure 5:
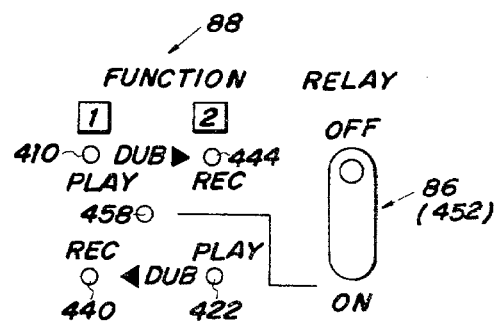
FIG. 5 shows function indicator means employable in the deck of FIGS. 1A, 1B and 3.

FIG. 5 shows an arrangement of the relay switch 86 (452) and the function indicator means 88. The function indicator means comprises the LEDs 410 and 440 for indication of record and playback associated with the first transport, the LEDs 422 and 444 for indication of record and playback associated with the second transport and the LED 458 for indication of relay mode in which the relay switch is turned on. Accordingly, in the dubbing from the first tape transport to the second tape transport, the LEDs 410 and 444 light and in the dubbing from the second transport to the first transport, the LEDs 422 and 440 are turned on. In the continuous playback, the relay switch is turned on to light the LEDs 410, 458 and 422, and in the continuous record, LEDs 440, 458 and 444 lights. Furthermore, independent PLAY and REC indications can be made. With the structure as mentioned above, during the recording, LEDs for playback indication are turned off. During the dubbing in either direction, the LED for the relay mode is not turned on even if the relay switch is actuated. For the relay mode is implemented only when both the transports are set in the record or playback mode.

The deck 10 is capable of timer continuous playback and timer continuous record. Stated illustratively, the transports are both set in the record or playback mode when the PAUSE buttons are depressed. In case the relay switch 425 is off, the first transport starts to record or playback at the first preset time. After the record or playback is automatically stopped, the second transport starts to record or playback at the second preset time. In case the relay switch 452 is on, the first and the second transport starts continuous record or continuous playback from the first preset time in the modes as mentioned above.

The deck 10 further has a muting function. It is desirable that a playback signal is not fed to the playback electrical circuit during a given period of time in the playback, e.g., during a period of time sufficient to prevent a noise caused by the head change-over relay 104 or a noise due to turning on the power. To this end, there is provided the muting transistor 116 for short-circuiting the input of the mixing amplifier as shown in FIG. 2. However, the muting by this transistor 116 is not sufficient to prevent an excess shock signal, which is eventually passed to a later stage. Therefore, the transistors 113 and 114 also are used for the muting to attain a double muting function.

The transition in state of the collector of the transistor 402 or the transition in state of the base voltage of the transistor 402 due to the PLAY switch 400 or the REC switch 434a associated with the first transport is applied to a transistor 480 in the form of a pulse signal to turn it on. Thus, a condenser 482 discharges. The transistor 480 is turned off again and the condenser 482 starts to charge. A transistor 486 remains off until the charged potential exceeds a barrier voltage level of a Zener diode 484, during which a positive level voltage is set up at a terminal 488. This voltage is applied to the base of the transistor 116 shown in FIG. 2 to turn it on. Furthermore, the positive voltage of the terminal 488 is applied to the terminals 404 and 416 through diodes 490 and 492, respectively to turn on the transistors 113 and 114, respectively. The periods of time during which the muting transistors 116, 113 and 114 remain on are varied depending upon a charging and discharging time constant but normally set from 1 to 2 seconds. There is further provided means for effecting the muting in such a state that either of the PLAY buttons of the first and the second transport are not depressed. This means comprises a transistor 494. Unless either of the PLAY buttons are depressed, the switches 400 and 412 are in their on positions. Accordingly, no bias is applied to the base of the transistor 494 and the transistor remains off. Thus, a muting signal, in the form of a positive voltage, is applied to the terminal 488. When either of the PLAY buttons is depressed, the transistor 494 is turned on, which removes the muting voltage from the terminal 488.

We claim:

1. A record-playback system including first and second independently operable recording medium transport means for receiving and separately driving associated separate recording mediums; first and second record-playback means respectively for either recording signals upon or detecting signals from said recording mediums associated with said first and second transport means; first and second signal directing circuits connected respectively to said first and second recording-playback means; first and second manually operable operating mode selection means respectively associated with said first and second signal directing circuits each for respectively selecting either a recording mode of operation in the associated signal directing circuit where a signal to be recorded is fed through the associated signal directing circuit to the associated record-playback means for recording on the associated recording medium or for selecting a reproducing mode of operation therefor where signals recorded on the associated recording medium are reproduced and fed to the associated signal directing circuit; first and second control means operable in cooperation with each other to insure that if both said first and second operating mode selecting means are operated to call for a recording or reproducing mode only a predetermined transport means, signal directing circuit and associated record-playback means will be so operated while the other circuit is operable in the other mode unless another manually operable means is operated; third control means for detecting the movement of the transport means associated with said predetermined signal directing circuit; fourth control means responsive to the ending of the movement in the latter transport means for starting the movement of the other transport means; manually operable fifth control means for presetting an uninterrupted recording or reproducing mode of operation of said first and second directing circuits when a recording or reproducing mode of operation is completed on the recording medium on said latter transport means, the signal direction circuit associated with said other transport means then initiating a similar recording or reproducing mode of operation when said first and second manually operable operating mode selection means had been operated to effect an identical recording or reproducing mode of operation; and means for operating the fourth control means only when said first and second operating mode selection means are operated to select the same operating modes at the same time after the fifth control means is operated.

2. The record-playback system of claim 1 where said signal directing circuits include means for providing bi-directional dubbing comprising means for selectively feeding a reproduced signal present in a selected signal directing circuit to the other signal directing circuit for recording when said first and second manually operable operating mode selecting means are operated to effect different ones of said modes of operation, wherein such signal is fed to the record-playback means associated with said other signal directing circuit.

3. The record-playback system of claims 2, 1 or 4 wherein there is respectively associated with said first and second signal directing circuits mode selection indicating means which respectively indicate when the associated first and second manually operable operating mode selection means are operated to effect a recording mode of operation, a third and fourth indicating means respectively associated with said first and second manually operable means and operated to effect a reproducing mode of operation.

4. The record-playback system of claim 1 wherein there is respectively associated with said first and second signal directing circuits mode selection indicating means which respectively indicate when the associated first and second manually operable operating mode selection means are operated to effect a recording mode of operation, third and fourth indicating means respectively associated with said first and second signal directing circuits for indicating when the associated first and second manually operable means are operated to effect a reproducing mode of operation, and there is provided fifth indicating means which provides an indication that said manually operable third control means is operated to effect an uninterrupted recording or reproducing mode of operation when said first and second manually operable mode selection means are both operated to effect either a recording or reproducing mode of operation.

5. The record-playback system of claims 2, 1, 3 or 4 wherein there is provided inhibiting control means for preventing a simultaneous recording or reproducing mode of operation of said signal directing circuits.

6. The record-playback system of claim 2 wherein there is provided inhibiting control means for preventing a simultaneous recording or reproducing mode of operation of said signal directing circuits, and said first and second record-playback means each comprises a pair of terminals extending to a pair of terminals for receiving the signal reproduced by or receiving the signal to be recorded by the associated record-playback means, first and second reproducing amplifier means for receiving signals to be recorded and each coupled to one of the terminals of said record-playback means for amplifying the signals to be reproduced and to be recorded by the record-playback means, switch means having first and second conditions respectively when said first and second manually operable mode selection means are respectively operated to effect said recording and reproducing modes of operation for disabling the reproducing amplifiers associated with one of the terminals of each record-playback means and enabling the operation of the other reproducing amplifier means so that only one of said record-playback means can be operated in a recording or reproducing mode at the same time.

7. The record-playback system of claim 2, 1, 4, or 5 wherein said fifth control means is a pause control means.

* * * * *